United States Patent
Stein (10) Patent No.: US 7,551,938 B1
(45) Date of Patent: Jun. 23, 2009

(54) COMMAND POST RADIO

(76) Inventor: Michael Stein, 1769 W. End Ave., New Hyde Park, NY (US) 11040

( * ) Notice: Subject to any disclaimer, the term of this patent is extended or adjusted under 35 U.S.C. 154(b) by 457 days.

(21) Appl. No.: 10/948,067

(22) Filed: Sep. 23, 2004

Related U.S. Application Data (60) Provisional application No. 60/505,141, filed on Sep. 23, 2003.

(51) Int. Cl.
*H04B 7/00* (2006.01)
*H04M 11/04* (2006.01)

(52) U.S. Cl. .................. 455/518; 455/519; 455/515

(58) Field of Classification Search ............. 455/90.2, 455/7, 11.1, 20, 90.1–90.3, 518–519, 39, 455/515, 521, 13.1, 15, 16
See application file for complete search history.

(56) References Cited

U.S. PATENT DOCUMENTS

| | | | | |
|---|---|---|---|---|
| 4,097,809 | A * | 6/1978 | Miller ..................... | 455/11.1 |
| 4,152,647 | A * | 5/1979 | Gladden et al. ........... | 455/11.1 |
| 4,232,390 | A * | 11/1980 | McEvilly, Jr. ............. | 455/77 |
| 5,212,714 | A * | 5/1993 | Grindahl et al. ........... | 375/216 |
| 5,408,679 | A * | 4/1995 | Masuda .................... | 455/11.1 |
| 5,479,400 | A * | 12/1995 | Dilworth et al. ........... | 370/331 |
| 5,910,996 | A * | 6/1999 | Eggers et al. .............. | 381/107 |
| 6,188,939 | B1 * | 2/2001 | Morgan et al. ............. | 701/36 |
| 7,190,799 | B2 * | 3/2007 | Bray et al. ................ | 381/86 |
| 2002/0008625 | A1 * | 1/2002 | Adams et al. ............. | 340/573.1 |
| 2004/0176028 | A1 * | 9/2004 | Dibernardo ............... | 455/13.1 |

OTHER PUBLICATIONS

Guide for the Selection of Communication Equipment for Emergency First Responders vol. I (NIJ Guide 104-00) NCJ 191160, Feb. 2002, NIJ Guide, by Dr. Alim A. Fatah, John A. Barrett, Richard D. Arcilesi, Jr., Dr. Patrick S. Scolla, Charlotte H. Lattin, and Susan D. Fortner, pp. 3-12, http://www.ncjrs.gov/pdffiles1/nij/191160.pdf.*
Craig LaBarge, "Simplex Cross-Band Repeat Operation", http://www.qsl.net/wb3gck/cbr.htm, 2000.*
Steve Davis, Dave Hadler, "Portable Repeaters for AREC Use", http://www.nzart.org.nz/nzart/branches/chch/branch05/arec/xbandart1.html ,Mar. 1994.*

(Continued)

*Primary Examiner*—Sonny Trinh
(74) *Attorney, Agent, or Firm*—Brian E. Mack; Ropes & Gray LLP (57) ABSTRACT

A command post radio provides for more reliable radio communications between two or more locations using handie talkies by incorporating in the use of a command post radio. In one embodiment, a firefighter on a fire floor of a building can use a handie talkie to send a signal to a post radio on a floor below the fire floor. The post radio can boost and transmit the signal to a mobile radio and Cross Band repeater in a Battalion car where the signal is then transmitted to a handie talkie carried by the Battalion Chief in the lobby of the building. The Battalion Chief can respond to the firefighter on the fire floor via the same path. In addition to use by fire departments, the post radio can be used by different groups for different operations.

23 Claims, 10 Drawing Sheets

OTHER PUBLICATIONS

Alice McQuillan, Daily News, "FDNY inventor's radio has Bravest pumped up," Nov. 27, 2002.

Ellen La Regina, New Hyde Park Herald Courier, "Mike Stein—Inventor Supreme," vol. 61, No. 50.

Eric Lipton, The New York Times, "A New Weapon for Firefighters: Fire Dept. Gets Better Radio, but Needs Much More", May 30, 2004.

Michael Weissenstein, Associated Press, "FDNY Officials Praise New Radio," http://cms.firehouse.com/content/article/article.jsp, Nov. 27, 2002.

Murray Weiss, New York Post, "Good Reception For FDNY Radio," Nov. 27, 2002.

Panther Electronics, "Panther Fire C.A.T. System: Portable Cross Band Repeater," www.pantherelectronics.com, Dec. 2, 2002.

Panther Electronics, "Panther Fire C.A.T. System: Portable Command Post 2001-CP Control Station," www.pantherelectronics.com, Mar. 20, 2003.

Panther Electronics, "Panther Fire C.A.T. System: Portable In Band Repeater," www.pantherelectronics.com, Jun. 20, 2003.

Panther Electronics, "Panther Fire C.A.T. System: Portable Command Post 2001-CP Control Station," www.pantherelectronics.com, Dec. 22, 2004.

* cited by examiner

| General Radio Specifications ||
|---|---|
| Frequency Range | 450 - 500MHz Wide Band UHF |
| Total Zones (max) | 128 |
| Conventional Zones (max) \Ch max | 128\128 |
| Trunking Zone (max) | 32 |
| Trunking GID's (max) | 250 |
| Channel Spacing (wide\narrow) | 25kHz\12.5kHz |
| PLL Step | 5,6,25kHz |
| Channel frequency spread | 50MHz |
| Operating voltage | 13.6V DC (+ 15%) |
| Current Drain          Standby | 0.5A |
| Receive | 2.3A |
| Transmit | Less than 13A |
| Duty Cycle | Transmit 20% |
| Operating Temperature Range | -22° / 140° F (-30°C - +60°C) |
| Frequency Stability<br>-22° / 140° F (-30°C - +60°C) | +\- 0.00025% |
| Antenna Impedance | 50Ω |
|  |  |
| RECEIVER (Measurements made per EIA /TIA -2040) ||
| Sensitivity        12 dB SINAD | 0.35 Micro volts |
| 20 dB Quieting | 0.45 Micro volts |
| Selectivity       Wide | 80dB (+\ - 25kHz) |
| Narrow | 73dB (+\ - 12.5kHz) |
| Intermodulation Distortion    Wide | 79dB (+\ - 25. 50kHz) |
| Narrow | 73dB (+\ - 12.5. 25kHz) |
| Spurious response | 85dB |
| Audio Output - internal speaker | 3.2W@ 16Ω 3% distortion |
| TRANSMITTER (Measurements made per EIA/TIA 152C) ||
| RF power output (High/Low) | 45 W |
| Spurious Harmonics | Less than 75dB |
| FM Noise (Wide/Narrow) | 48dB / 42dB |
| Modulation Distortion | Less than 1% @ 1000 Hz |

COMMAND POST RADIO

CROSS REFERENCE TO RELATED APPLICATION

This application claims the benefit of U.S. provisional application No. 60/505,141, filed Sep. 23, 2003, which is hereby incorporated by reference herein in its entirety.

BACKGROUND OF THE INVENTION

This invention relates to radio communications. More particularly, this invention relates to improving radio communications between two or more locations using handie talkies by incorporating in the use of a command post radio.

Handie talkies (HT) are handheld, portable two-way radio transceivers that allow communications between two parties. Handie talkies typically send signals over a very high frequency (VHF) band or an ultra high frequency (UHF) band. A VHF band ranges from about 136 MegaHertz (MHz) to about 174 MHz. A UHF band ranges from about 403 MHz to about 512 MHz. Repeaters are commonly used with handie talkies to extend the radio signals from one handie talkie to another. Handie talkies are often used, for example, by public safety departments including the police departments, fire departments, and emergency medical services (EMS).

As an illustration, firefighters commonly use a Battalion Car Cross Band Repeater system to communicate with one another using handie talkies. The Battalion Car Cross Band Repeater may include, for example, the following: a UHF handie talkie, a UHF mobile radio, a Cross Band repeater, and a VHF handie talkie. When there is a fire in a building, a firefighter from the fire floor will use a handie talkie to communicate with a first-due Battalion Chief who may be situated in the lobby of the building. The handie talkie is typically a 1-5 watt UHF handie talkie that generates a UHF signal on a particular channel (e.g., on channel 2 at a frequency of 485.1875 MHZ, or on another high-rise channel). The UHF signal is transmitted to the UHF mobile radio located outside of the building, for example, in a vehicle such as a Battalion car. The UHF mobile radio then sends the UHF signal to the Cross Band repeater also located in the Battalion car. The Cross Band repeater regenerates the UHF signal to a VHF signal (e.g., at a frequency of 153.83 MHz) at 5 watts to the VHF handie talkie held by the Battalion Chief.

The Battalion Chief can respond to the firefighter on the fire floor by using the VHF handie talkie to send a 5-watt VHF signal (e.g., 153.83 MHz) to the Cross Band repeater. The Cross Band repeater sends the VHF signal to the UHF mobile radio where the signal is regenerated to a UHF signal (e.g., 485.1875 MHz) at 40 watts to the UHF handie talkie on the fire floor.

The operation of the Cross Band Repeater system is dual simplex. Simplex communications occur when the radios transmit and receive signals over the same frequency. Duplex communications occur when the radios transmit on one frequency and receive on a different frequency via an infrastructure such as a building repeater. Duplex communications are often used with a building repeater for both security and maintenance crews. A drawback to this type of communication in the fire service is that the service must then depend on an infrastructure that is not controlled by the fire department. In some situations, the effectiveness of the building repeater can be compromised by fire, interruptions in power, or some other event. When such an event occurs, firefighters using the handie talkies may be prevented from communicating with one another.

There are several problems and limitations with the current Cross Band Repeater system. For the UHF handie talkie on the fire floor to effectively receive and transmit signals to the UHF mobile radio in the vehicle, the UHF handie talkie often needs to be near a window. Currently most high-rise ground communications originate from the core or elevator lobby on the fire floor or floor below. This makes the UHF handie talkies, which are currently 5 watts in strength, sometimes too weak to reach the Cross Band repeater in the vehicle.

In view of the foregoing, it would be desirable to provide more reliable radio communications between two or more locations using handie talkies by incorporating in the use of a command post radio.

SUMMARY OF THE INVENTION

In accordance with this invention, a command post radio provides for more reliable radio communications between two or more locations using handie talkies by incorporating in the use of a command post radio. The post radio can be used by many different groups, including, for example, fire departments, police departments, emergency medical services (EMS), military groups (e.g., army, navy, marines, air force), security agencies, search-and-rescue teams, businesses, volunteer organizations, and other suitable groups. These different groups can use the post radio for a number of different operations, including, for example, during building fires, forest fires, large brush fires, police chases, investigations, sting operations, medical emergencies, military operations, security detail (e.g., in buildings, bridges, airports, train stations, subways), search-and-rescue operations, business operations (e.g., at farms, oil refineries, mines), and large scale events (e.g., concerts, fairs, carnivals, rallies, parades, races, walks).

For clarity and specificity, the invention is primarily described herein in the context of being used by the fire department in dealing with building fires. The post radio may provide more powerful communications between a firefighter on a fire floor of a building and a Battalion Chief in the lobby of the building. The firefighter on the fire floor of a building can use a UHF handie talkie to communicate a message to a Battalion Chief using a UHF handie talkie on the floor below the fire who will then relay that message to the Battalion Chief in the lobby of the building via a post radio.

The UHF handie talkie on the fire floor can transmit a UHF signal, at one frequency (e.g., 486.1125 MHz) to the chief's handie talkie. The chief, via a post radio, can boost and transmit the UHF signal, at a second frequency (e.g., 485.1875 MHz), to a mobile radio and Cross Band repeater in the Battalion car. The Cross Band repeater regenerates the UHF signal into a VHF signal for transmission to the VHF handie talkie in the lobby.

The Battalion Chief in the lobby can use the VHF handie talkie to transmit a VHF signal (e.g., 153.83 MHz) to the Cross Band repeater and mobile radio where the VHF signal can be regenerated into a UHF signal, at one frequency (e.g., 485.1875 MHz), for transmission to the post radio. The Battalion Chief, on the floor below the fire, can then send the UHF signal on his handie talkie, over a second UHF frequency (e.g., 486.1125 MHz), to the UHF handie talkie on the fire floor.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

For clarity and specificity, the invention is primarily described herein in the context of the command post radio being used by the fire department in dealing with building fires. However, the invention, in other embodiments, can be used by the fire department during other types of operations and by other suitable groups for other suitable operations.

Figure 1:
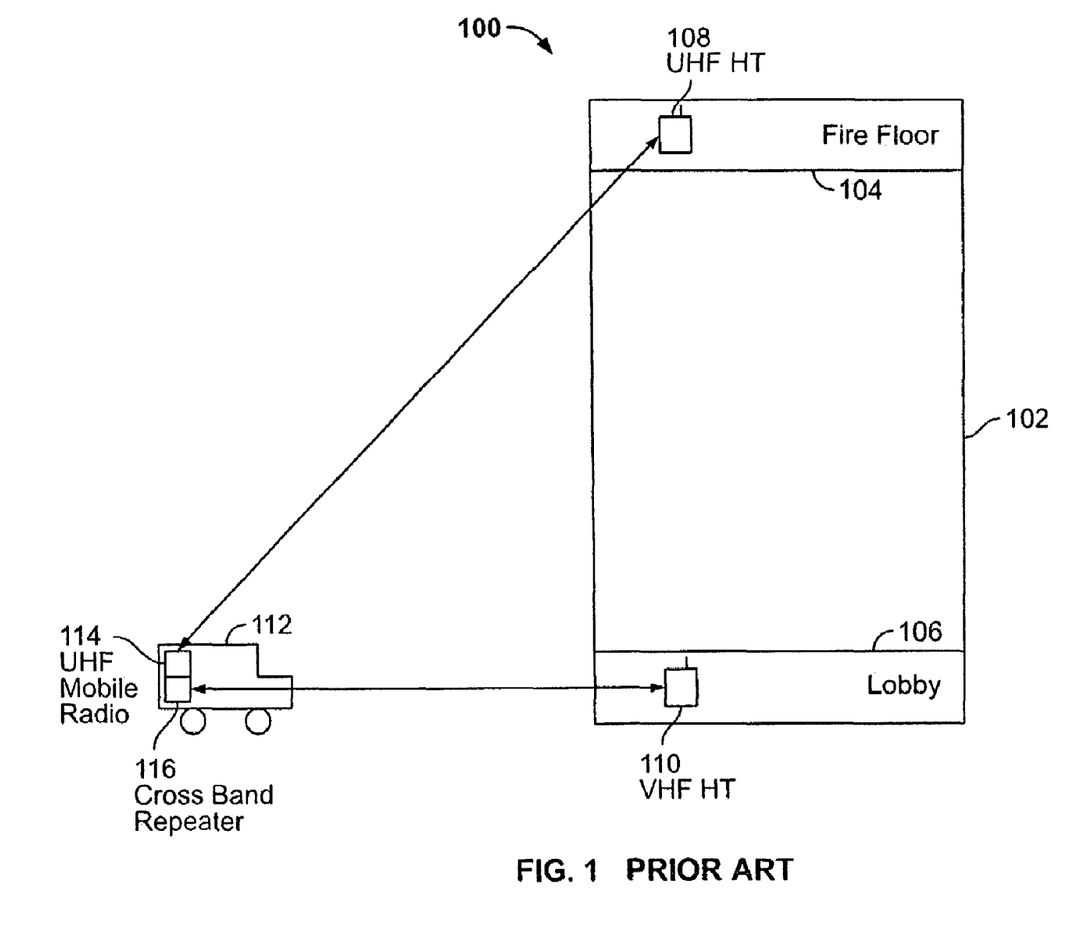
FIG. 1 is a diagram of a Cross Band Repeater system.

FIG. 1 is a diagram of a Battalion Car Cross Band Repeater system 100. A firefighter will use an ultra high frequency (UHF) handie talkie (HT) 108 on the fire floor 104 of a building 102 to communicate with a Battalion Chief using a very high frequency (VHF) handie talkie 110 in the lobby 106 of the building 102. The UHF handie talkie 108, which is typically a 5-watt UHF handie talkie, generates a UHF signal (e.g., at a frequency of 485.1875 MHz) that is transmitted to a UHF mobile radio 114 located outside building 102 in, for example, a Battalion car 112. The UHF mobile radio 114 then sends the UHF signal to a Cross Band repeater 116, also in Battalion car 112, where the signal is regenerated to a VHF signal (e.g., at a frequency of 153.83 MHz) at 5 watts to the VHF handie talkie 110.

The Battalion Chief can respond to the firefighter on the fire floor 104 by using the VHF handie talkie 110 to send a 5-watt VHF signal (e.g., 153.83 MHz) to the Cross Band repeater 116. The Cross Band repeater 116 sends the VHF signal to the UHF mobile radio 114 where the signal is regenerated to a UHF signal (e.g., 485.1875 MHz) at 40 watts to the UHF handie talkie 108 on the fire floor 104.

The Battalion Car Cross Band Repeater system 100 has several limitations. In particular, the UHF handie talkie 108, which is currently 5 watts in strength, sends signals from the fire floor 104 that are sometimes too weak to reach the Cross Band repeater 116 in the Battalion car 112. Should the Battalion car get damaged or lose power, the communications link may be broken.

In accordance with the invention, different embodiments or combinations of embodiments can be used to provide more reliable radio communications. In one embodiment, the strength of the signals being transmitted to and received from the UHF and VHF handie talkies 108 and 110, respectively, can be increased by using more powerful post radios. For example, instead of using 5-watt UHF and VHF handie talkies, the wattage of the VHF and UHF post radio can be increased to 45-watts or any other suitable wattage.

In another embodiment, rather than using a UHF handie talkie 108 on the fire floor 104, a command post radio can be used. The UHF post radio on the fire floor 104 and in the lobby 106 can be, for example, UHF and VHF post radios which are more powerful. The post radio has several advantages over the handie talkies. For example, the UHF post radio provides more available frequencies, produces signals that are better able to penetrate high-rise structures, and provides the ability to communicate with other agencies (e.g., interoperability with the Police Department (PD), Emergency Medical Service (EMS), Office of Emergency Management (OEM)).

Figure 2:
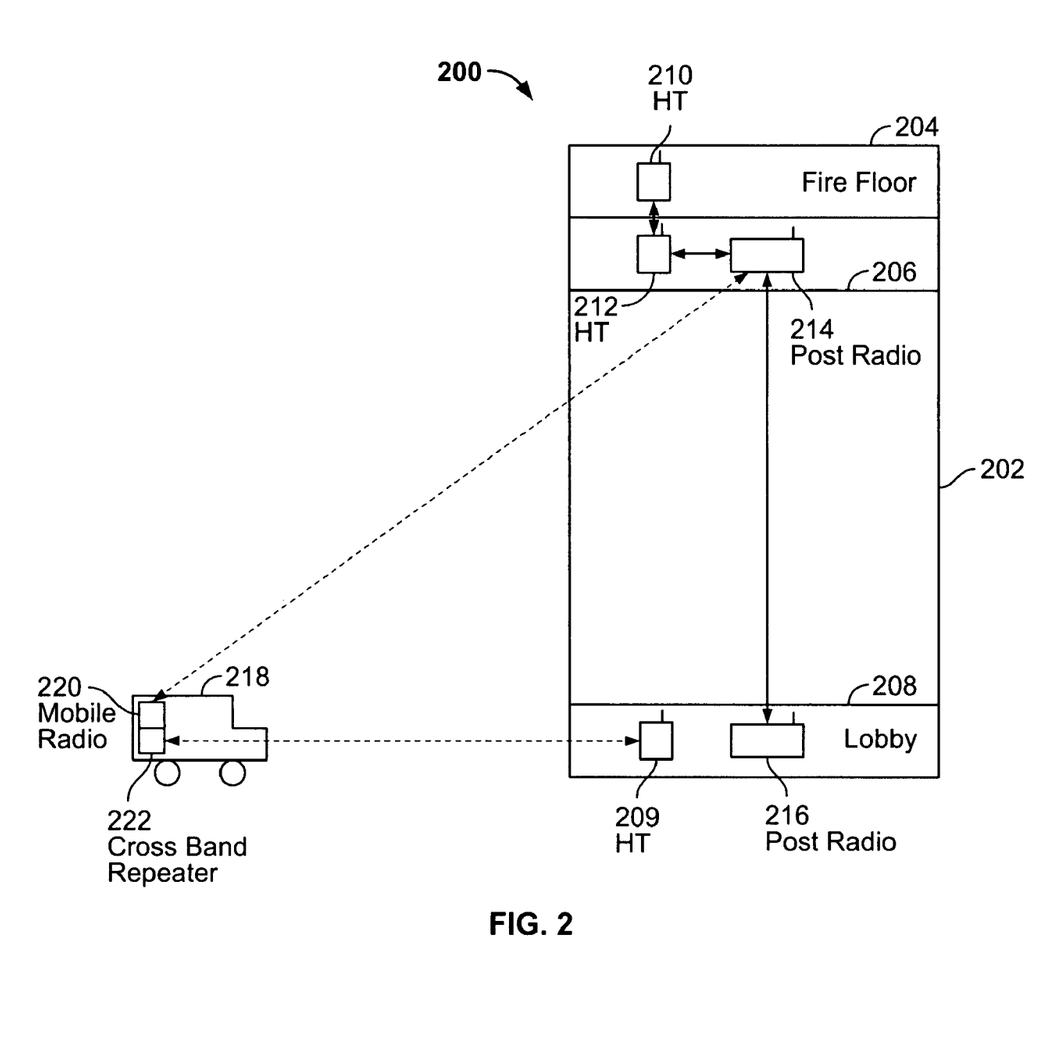
FIG. 2 is a diagram of a system using a command post radio in accordance with one embodiment of the invention.

A command post radio can be used to provide a more reliable and powerful signal from a floor below the fire to the lobby of the building. FIG. 2 illustrates a Battalion Car Cross Band Repeater system 200 using a post radio in accordance with one embodiment of the invention. The first-due Battalion Chief, upon arrival at a building 202 in his Battalion car 218, can bring a VHF handie talkie 209 and a post radio 216 to the lobby 208 of the building 202. The Battalion Chief can communicate using the VHF handie talkie 209 in the lobby 208 while a second-due Engine Officer can bring a post radio 214 to a floor 206 below the fire floor 204. Floor 206 can be the floor directly below the fire floor 204 or several floors below the fire floor 204.

A firefighter on the fire floor 204 can use a handie talkie 210 for communications. Although the invention is described primarily in the context of a UHF handie talkie for clarity, handie talkie 210 may be a VHF handie talkie, a UHF handie talkie, or other suitable handie talkie at any suitable wattage (e.g., 2 watts, 5 watts). Handie talkie 210 transmits a UHF signal, at one frequency (e.g., 486.1125 MHz or other suitable frequency), to a similar handie talkie using the same frequency 212 on the floor below the fire floor 206. Post radio 214 boosts and transmits the UHF signal, at a second frequency (e.g., 485.1875 MHz or other suitable frequency), to a mobile radio 220 and Cross Band repeater 222 in the Battalion car 218. The Cross Band repeater 222 regenerates the UHF signal into a VHF signal for transmission to VHF handie talkie 209 in the lobby 208.

The Battalion Chief in lobby can use the VHF handie talkie 209 to transmit a signal (e.g., 153.83 MHz or other suitable frequency) to the Cross Band repeater 222 and mobile radio 220 where the VHF signal is regenerated into a UHF signal, at one frequency (e.g., 485.1875 MHz or other suitable frequency), for transmission to the post radio 214 on the floor below the fire floor 206. The second-due Engine Officer, upon receiving this signal on post radio 214, can then send the message via UHF handie talkie 212 over a second frequency (e.g., 486.1125 MHz or other suitable frequency), to the handie talkie 210 on the fire floor 204.

In another embodiment, handie talkie 212 may receive the signals from mobile radio 220. For example, in the event that the post radio were to fail, the second-due Engine Officer, as a back-up, could revert back to the conventional way of communicating by switching handie talkie 212 to the selected channel (e.g., at 485.1875 MHz or other suitable frequency). Handie talkie 212 can send signals to, and receive signals from, mobile radio 220 and Cross Band repeater 222. Alternatively, handie talkie 210 can directly send signals to, and receive signals from, mobile radio 220 and Cross Band repeater 222. This may require the members to be near a window facing the Battalion Car 218

In yet another embodiment, handie talkie 210 can be a UHF handie talkie having a wattage of 2 watts or other suitable wattage. For example, UHF handie talkie 210 can communicate with the handie talkie 209 in the lobby via post radio 214, mobile radio 220 (which can be a UHF mobile radio), and Cross Band repeater 222. Alternatively, UHF handie talkie 210 can communicate with handie talkie 209 in the lobby via post radio 214 and post radio 216. UHF handie talkie 210 can send UHF signals to and receive UHF signals from handie talkie 212 at one frequency, while post radio 214 can send the UHF signals to and receive UHF signals from either mobile radio 220 or UHF post radio 216 at a second frequency.

For other embodiments where the post radio can be used in an area other than a high-rise structure, the post radio may be situated in any suitable location. For example, the post radio may be situated in a location (e.g., between the Cross Band repeater and handie talkies) that generates the strongest signals.

Figure 3:
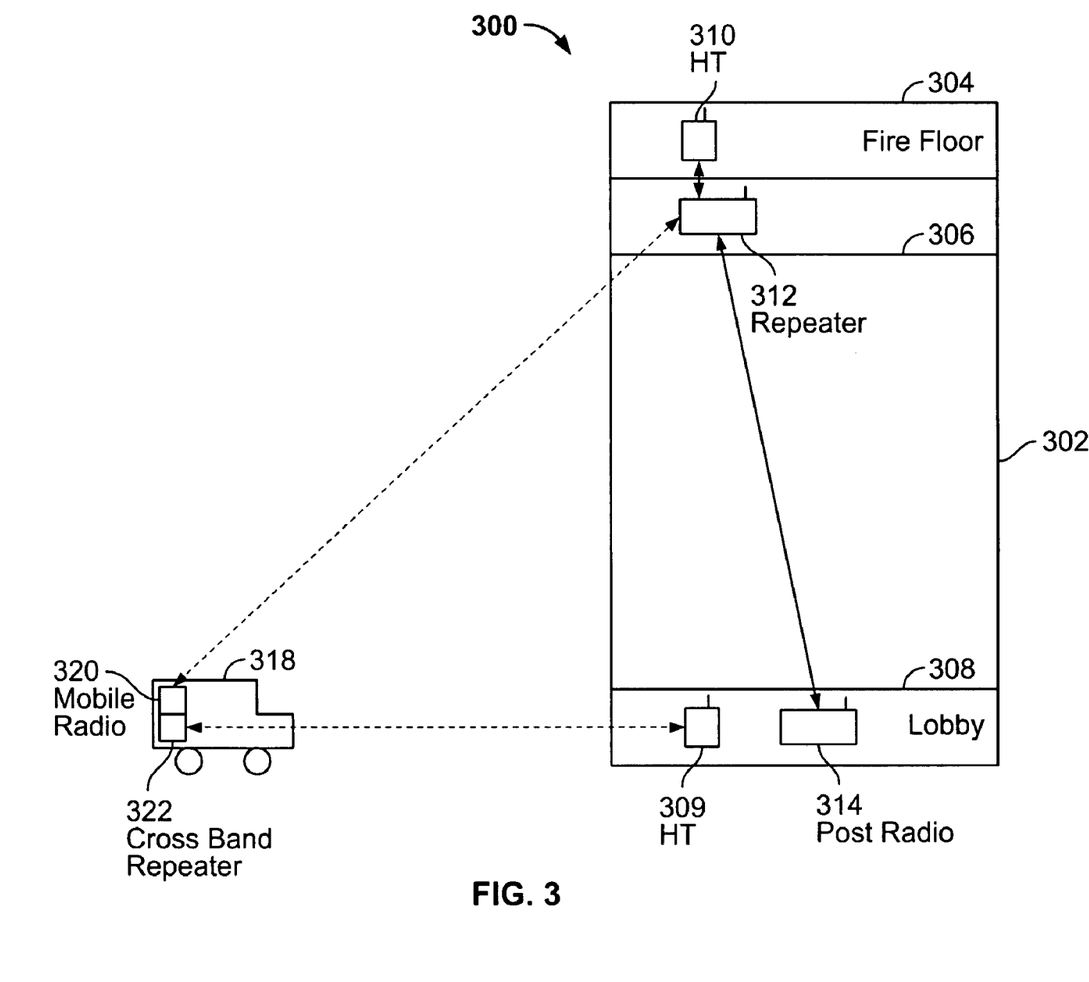
FIG. 3 is a diagram of a system using a command post radio in accordance with another embodiment of the invention.

In accordance with yet another embodiment of the invention, a portable repeater and command post radio can be used as illustrated in FIG. 3. In system 300, to overcome the problem of the signals from the fire floor 304 not being able to reach the Cross Band repeater 322 in the Battalion car 318, one approach may be to create a portable repeater by linking two post radios together. An in-band portable repeater 312 can be created using two post radios, which can be self-contained and self-powered by a direct current (DC) power source battery (e.g., 12 volts). The portable repeater 312 can be brought to a floor 306 in the building 302 below the fire floor 304. A signal generated from the handie talkie 310 on the fire floor 304 can be received by one post radio of the portable repeater 312. The second post radio of the portable repeater 312 can then boost and transmit the signal on a different frequency to the mobile radio 320 and then to the Cross Band repeater 322 in the Battalion car 318. Battalion car 318 then transmits the signal to handie talkie 309 in the lobby 308.

In system 300, a firefighter on a fire floor 304 of a building 302 can communicate using a UHF handie talkie 310. The UHF handie talkie 310, which may have a wattage of 2 watts or other suitable wattage, sends a UHF signal at a given frequency to a portable repeater 312 having two post radios that may be located on a floor 306 below the fire floor 304. The portable repeater 312 switches the UHF signal having the given frequency to a second UHF frequency and transmits the UHF signal, which may be at 45 watts or other suitable wattage, to a post radio 314 in the lobby 308 of the building 302. This system can allow communications in the event Battalion Car 318 is damaged or missing.

The Battalion Chief can return communications using the post radio 314 to send a UHF signal, which may be at 45 watts or other suitable wattage, to the portable repeater 312. The portable repeater 312 then switches the frequency of the UHF signal to the UHF frequency corresponding to the channel with which the UHF handie talkie 310 is set. The UHF signal is then transmitted, at 5 watts or other suitable wattage, to the UHF handie talkie 310 on fire floor 304. Both the portable repeater 312 and the post radio 314 can be charged at a site in a building (e.g., building 302), such as the Fire Command Station, in a locked box accessible only to fire department personnel. System 300 can be designed such that transmission of signals over a given channel is sent out only within the building 302 and is not sent out to the entire city. System 300 can also be designed to allow point-to-point communication even in the event of the failure of the portable repeater 312. Advantageously, system 300 does not depend on an in-building infrastructure or building power, resulting in more reliable communications.

The command post radio can have the ability to saturate an entire building with a signal to warn firefighters of imminent danger or to issue instructions such as an instruction to evacuate the building. The post radio, which can be located in the lobby of the building, in another area of the building, or outside of the building, can be set to the same frequency as the handie talkies held by the firefighters in that building and in other buildings. For example, post radio 216 can be set to the same frequency as handie talkies 210 and 212 in order to send warnings or instructions. Similarly, post radio 314 can be set to the same frequency as handie talkie 310 in order to send warnings or instructions.

The command post radio includes several features that are designed to provide more reliable and powerful radio communications. The features of the post radio are primarily described herein as features preferably used for operations by the fire department for clarity and specificity. However, other groups using the post radio for other operations may use the same post radio or may have their post radio customized for a particular use, which may include some of the same components (e.g., same brand, model number, or specifications), different components (e.g., different brand, model number, or specifications), additional features, and/or the absence of other features.

Figure 4:
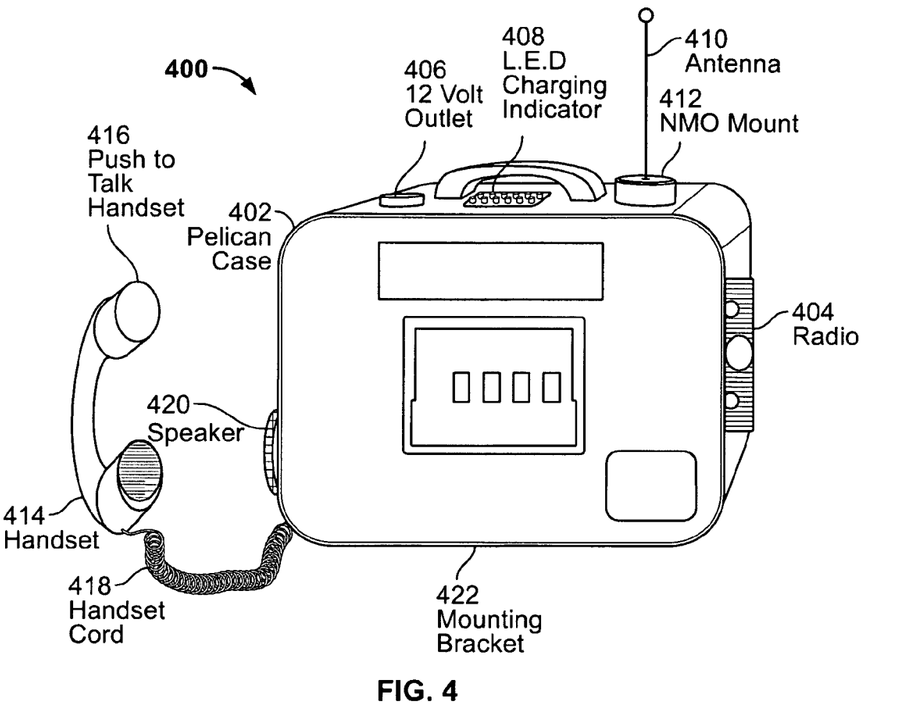
FIGS. 4-6 are diagrams of the command post radio in accordance with one embodiment of the invention.
Figure 5:
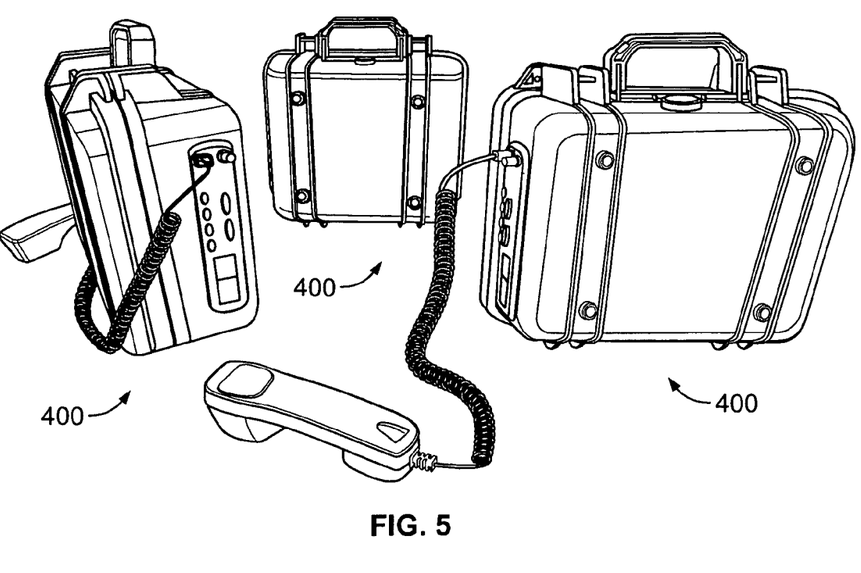
Figure 6:
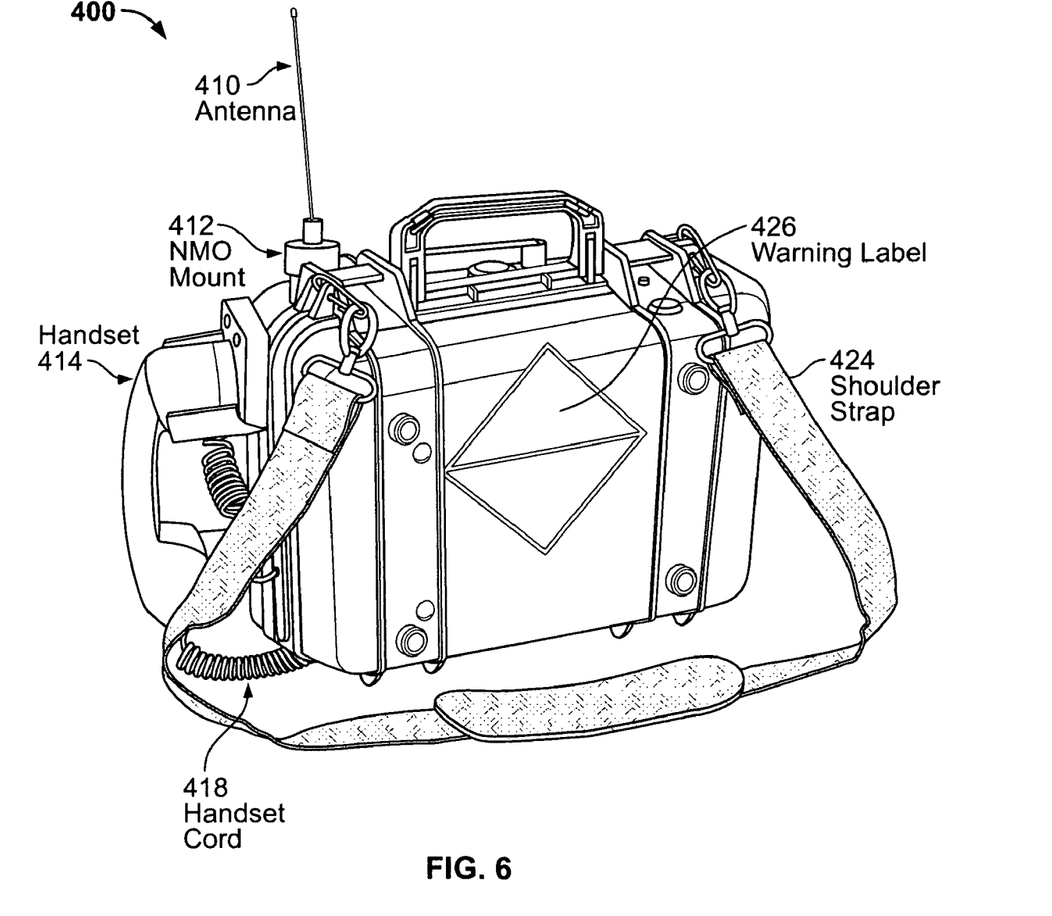
Figure 7:
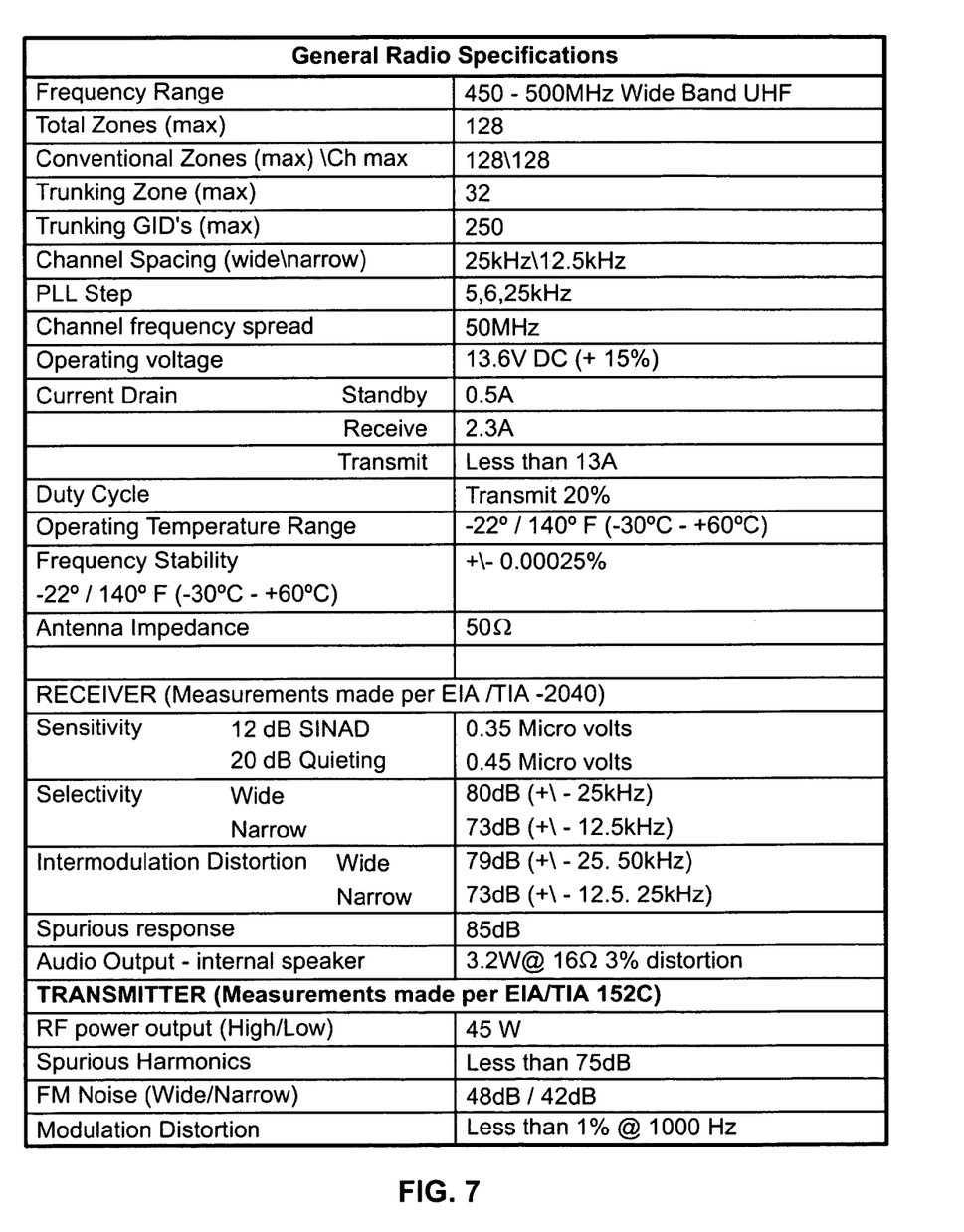
FIG. 7 is a chart illustrating the command post radio specifications in accordance with one embodiment of the invention.

FIGS. 4-6 are diagrams illustrating the post radio 400 and user accessible features of the post radio. The post radio 400 includes a radio that can be of any suitable wattage (e.g., 5 watts, 30 watts, 45 watts, 50 watts). For example, the radio can be a 45-watt Federal Communications Commission (FCC) approved public safety radio that is water resistant with an internal waterproof speaker. The radio, depending on the wattage, can have any suitable number of programmable channels (e.g., 16, 128, 150). In one embodiment, the radio can support up to 128 programmable channels. The radio can have adjustable power settings and/or can be designed to meet military 810 C, D, E, and F specifications. The radio can further be designed to transmit and receive radio signals via a UHF band, a VHF band, at 800 MHz, over other suitable frequency bands, or a combination of frequency bands. FIG. 7 is a chart of illustrative specifications for the post radio 400 in accordance with one embodiment of the invention. In other embodiments, the specifications may vary depending on the components used in the manufacturing of the post radio.

The radio can be powered by a battery such as a 12-volt 18-ampere hour non-spillable lead acid battery. The battery can include a slide-out pocket used to power the radio and auto-reset 12-volt circuit breakers. The battery can be capable of being used in any position. The battery preferably has an effectively long battery life (e.g., at least ten hours, at least four hours under a 20% transmit, 20% receiver, and 60% standby formula).

The radio and battery is preferably enclosed in a case such as, for example, a watertight, vented, non-conductive case 402. In one embodiment, the case can be a Pelican style #1400 case with the following dimensions: 13⅜"×11⅝"×6." Alternatively, depending on the size of the radio and the battery, a case having smaller or larger dimensions may be used. A heavy duty weatherproof push button may be available to control the power for the post radio. All radio features (e.g., channels) 404 are designed to be accessible from the exterior of the case.

An accessory plug outlet 406 with an AC charger and adapter cords can be provided for charging or powering accessories. The accessory plug outlet 406 can be, for example, a 12 volt stainless steel marine grade accessory plug outlet or other suitable accessory plug output. The AC charger can be a dual rate charger that automatically switches from fast charge mode to float mode, and from float mode to fast charge mode. The accessories can include a radio, a light source, a cellular telephone, a laptop computer, a personal digital assistant (PDA), or any other suitable device that can be charged or powered by, for example, a 12 volt power source. A light emitting diode (LED) indicator 408 can also be used to indicate charging level (e.g., ON for high rate charging or OFF for float charging). A visual low battery alert can further be installed on the case to alert the user when the post radio 400 is at 10 volts (or other predetermined voltage) or lower. In addition to or alternative to the visual low battery alert, an audio alert may be provided to alert the user when the post radio 400 is at 10 volts or lower.

An antenna 410 with a mount 412 can also be attached to the case 402. In one embodiment, the antenna 410 can be a non-ground plane matching UHF flexible rubber coated whip style handie talkie antenna and the mount 412 can be a non-magnetic option (NMO) mount or other suitable mount. The antenna can be about 10" from the base to the tip, or other suitable height.

Also available with the post radio 400 can be a phone style handset 414 or microphone with push-to-talk button 416. A cord 418 of a predetermined length (e.g., . . . 6', 7', 8,' . . . ) can be coupled to the handset 414 or microphone and securely mounted on the side of the case. Audio sounds (e.g., communications from handie talkies or audible indicators) can be provided over the handset 414 or from radio-mounted speakers 420.

The post radio 400 can also include a vehicle mounting bracket 422 to secure the post radio 400 in place in the vehicle so that the post radio 400 can be charged. The vehicle mounting bracket 422 can be a slide-in slide-out bracket or other suitable bracket that meets National Fire Protection Association (NFPA) Gravity-Force (G-Force) standards for emergency vehicles. The post radio 400 can further include an adjustable, removable, padded shoulder strap 424 to facilitate ease of carrying. A warning label 426 may also be provided on the case 402 that specifies safety requirements with respect to safe distances from a transmitting antenna in compliance with FCC requirements. The post radio 400 should be designed to meet all federal, state, and local standards.

In addition to the fire department's use of the post radio during building fires, there are other applications for the post radio. The post radio can be used for communications between various posts during high-rise operations including, for example, lobby command, operation, search and evacuation, and incident command and helicopter. The post radio can also be used for communications in a subway system from platform to street level. Yet another application is for communications in large open areas for events such as forest fires, large brush fires, and oil tank farms, and marine operations. The post radio can further be used for inter-agency communications with multiple command posts. Further, the use of the post radio can provide for the ability to maintain multiple units and to distribute information to incoming agencies at large scale events.

In addition to use by the fire departments, the post radio can be used by many different groups, including, for example, police departments, emergency medical services (EMS), military groups (e.g., army, navy, marines, air force), security agencies, search-and-rescue teams, businesses, volunteer organizations, and other suitable groups. These different groups can use the post radio for a number of different operations, including, for example, during police chases, investigations, sting operations, medical emergencies, military operations, security detail (e.g., in buildings, bridges, airports, train stations, subways), search-and-rescue operations, business operations (e.g., at farms, oil refineries, mines), and large scale events (e.g., concerts, fairs, carnivals, rallies, parades, races, walks). Further, by integrating a GPS board into the post radio, the post radio can be tracked on a map at large scale events so Incident Commanders can track their personnel.

Figure 8A:
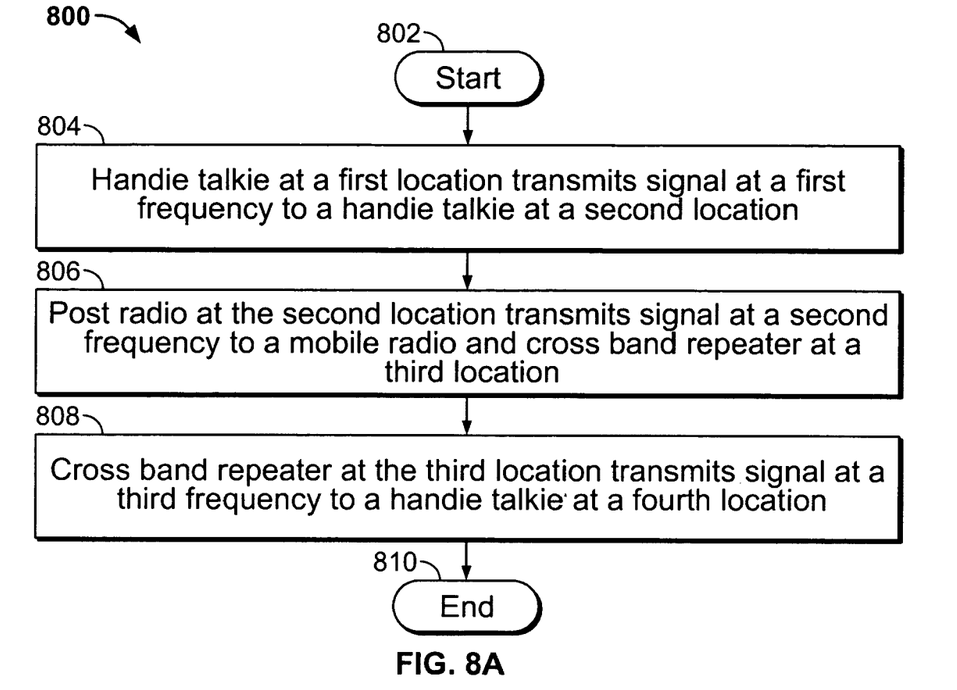
FIGS. 8A, 8B, 9A, 9B, 10A, 10B, 11A, and 11B are flow diagrams illustrating communications paths between two or more locations using handie talkies by incorporating in the use of a command post radio in accordance with different embodiments of the invention.
Figure 8B:
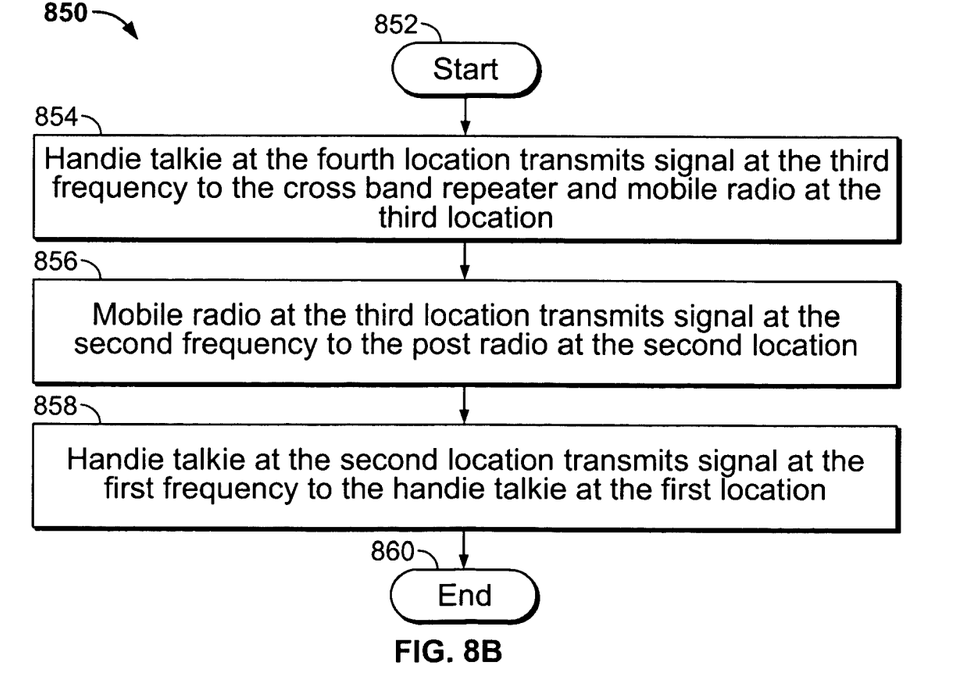

FIGS. 8A-8B are flow diagrams of the communications path between two or more locations using handie talkies by incorporating in the use of a command post radio in accordance with one embodiment of the invention. Path 800 begins at step 802. At step 804, a handie talkie at a first location transmits a signal at a first frequency to a handie talkie at a second location. The handie talkies may be VHF handie talkies, UHF handie talkies, or other suitable handie talkies. The first location may be the fire floor 204 of the building 202 or any other suitable location. The second location may be the floor 206 below the fire floor 204 of the building 202 or any other suitable location. The first frequency may be any suitable frequency within the frequency band of the handie talkie at the first location that is capable of being received by the handie talkie at the second location.

At step 806, in response to the handie talkie at the second location receiving the signal, the second-due Engine Officer sends the message to a post radio which boosts and transmits the signal at a second frequency to a mobile radio and Cross Band repeater at a third location. The third location may be in the Battalion car 218 outside of building 202 or any other suitable location. The second frequency may be any suitable frequency within the frequency band of the post radio at the second location that is capable of being received by the mobile radio and Cross Band repeater at the third location.

At step 808, the Cross Band repeater at the third location regenerates and transmits the signal at a third frequency to a handie talkie at a fourth location. The handie talkie may be a VHF handie talkie, UHF handie talkie, or any other suitable handie talkie. The fourth location may be the lobby 208 of the building 202 or any other suitable location. The third frequency may be any suitable frequency within the frequency band of the Cross Band repeater at the third location that is capable of being received by the handie talkie at the fourth location. Path 800 then ends at step 810.

Path 850 (FIG. 8B) illustrates the return communications path from the fourth location to the first location. Path 850 begins at step 852. At step 854, the handie talkie at the fourth location transmits a signal at the third frequency to the Cross Band repeater and mobile radio at the third location. The Cross Band repeater regenerates and transmits the signal at the second frequency to the mobile radio. At step 856, the mobile radio transmits the signal at the second frequency to the post radio at the second location. At step 858, in response to the post radio at the second location receiving the signal, the second-due Engine Officer sends the message to the handie talkie which regenerates and transmits the signal at the first frequency to the handie talkie at the first location. The post radio may be capable of receiving the signal from, and transmitting the signal to, multiple handie talkies at multiple locations. The signals may be transmitted to the handie talkies at one of the earlier transmitted frequencies or at any other suitable frequency capable of being received by the handie talkies. Path 850 then ends at step 860.

Figure 9A:
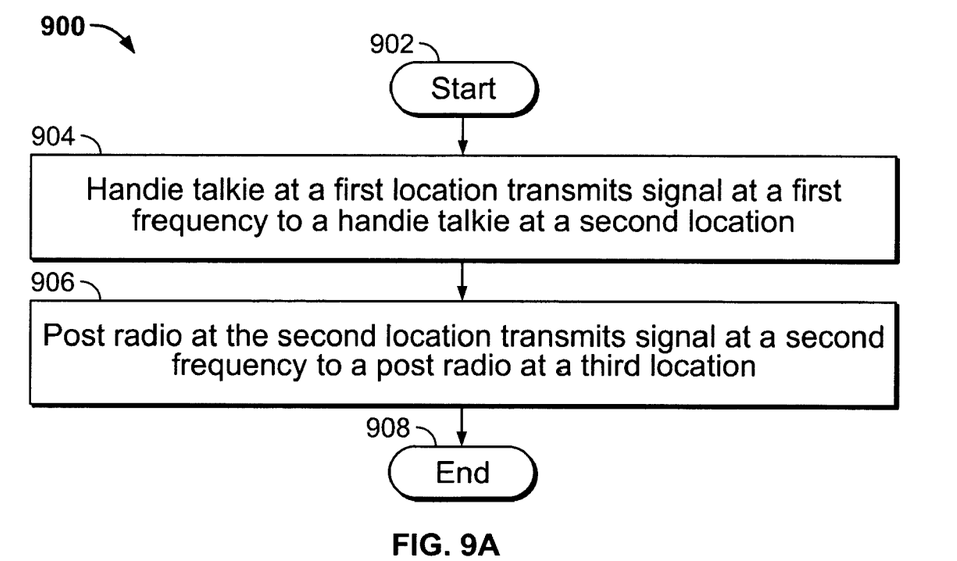
Figure 9B:
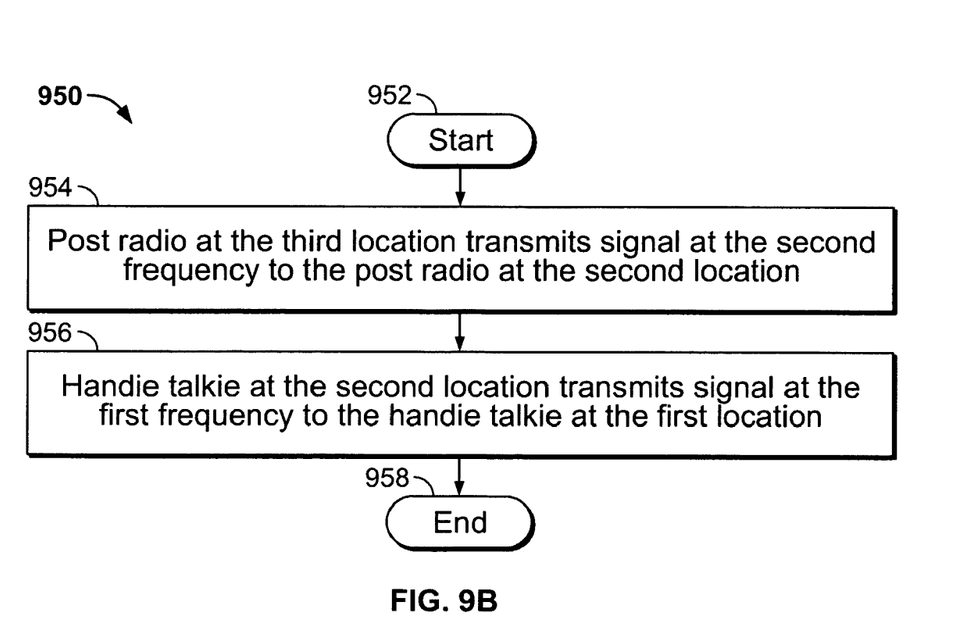

FIGS. 9A-9B are flow diagrams of the communications path between two or more locations using handie talkies by incorporating in the use of a command post radio in accordance with another embodiment of the invention. Path 900 begins at step 902. At step 904, a handie talkie at a first location transmits a signal at a first frequency to a handie talkie at a second location. The handie talkies may be VHF handie talkies, UHF handie talkies, or other suitable handie talkies. The first location may be the fire floor 204 of the building 202 or any other suitable location. The second location may be the floor 206 below the fire floor 204 of the building 202 or any other suitable location. The first frequency may be any suitable frequency within the frequency band of the handie talkie that is capable of being received by the handie talkie at the second location.

At step 906, in response to the handie talkie at the second location receiving the signal, the second-due Engine Officer sends the message to a post radio which boosts and transmits the signal at a second frequency to a post radio at a third location. The third location may be the lobby 208 of the building 202 or any other suitable location. The second frequency may be any suitable frequency within the frequency band of the post radio that is capable of being received by the second post radio.

Path 950 (FIG. 9B) illustrates the return communications path from the third location to the first location. Path 950 begins at 952. At step 954 the post radio at the third location boosts and transmits a signal at the second frequency to a post radio at the second location. At step 956, in response to the post radio at the second location receiving the signal, the second-due Engine Officer sends the message to the handie talkie which regenerates and transmits the signal at the first frequency to the handie talkie at the first location. The post radio may be capable of receiving the signal from, and transmitting the signal to, multiple handie talkies at multiple locations. The signal may be transmitted to the handie talkie at one of the earlier transmitted frequencies or at any other suitable frequency capable of being received by the handie talkie. Path 900 then ends at step 958.

Figure 10A:
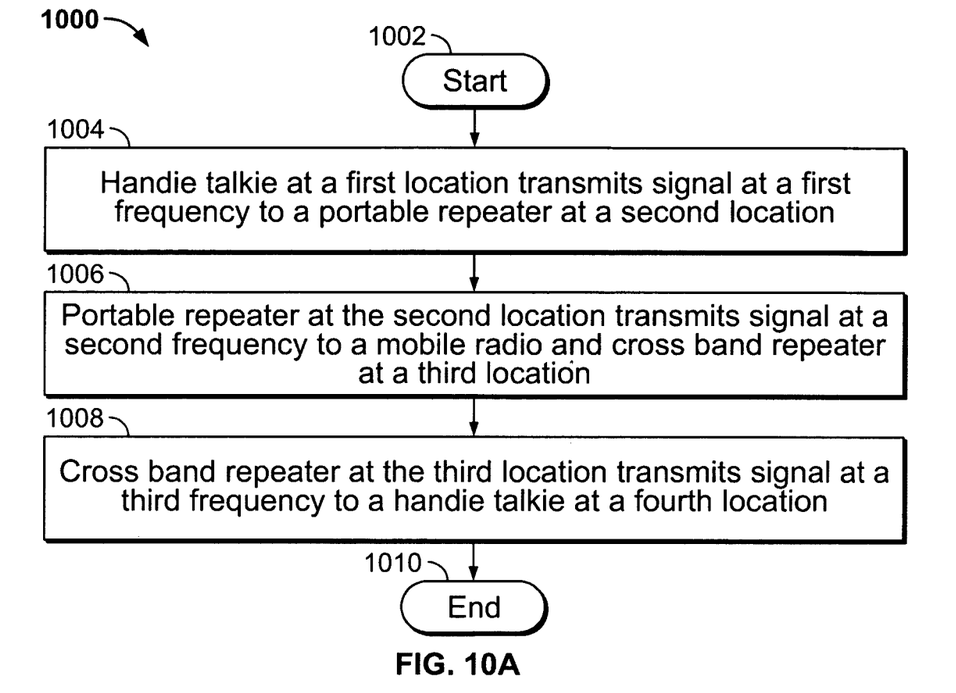
Figure 10B:
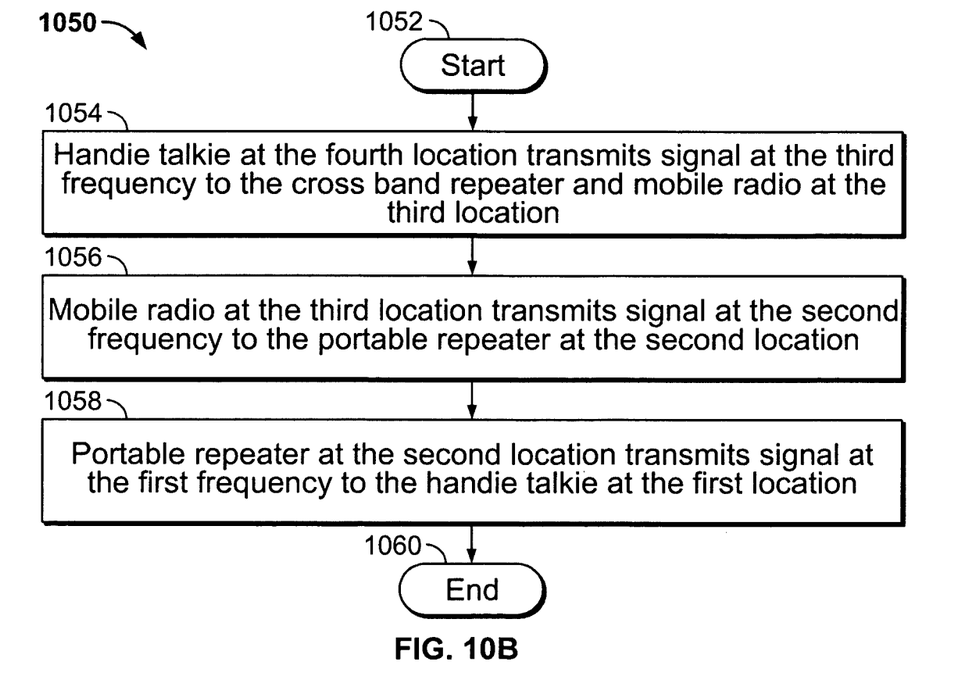

FIGS. 10A-10B are flow diagrams of the communications path between two or more locations using handie talkies by incorporating in the use of a command post radio in accordance with yet another embodiment of the invention. Path 1000 begins at step 1002. At step 1004, a handie talkie at a first location transmits a signal at a first frequency to a portable repeater having two post radios linked together at a second location. The first location may be the fire floor 304 of the building 302 or any other suitable location. The second location may be the floor 306 below the fire floor 304 of the building 302 or any other suitable location. The first frequency may be any suitable frequency within the frequency band of the handie talkie at the first location that is capable of being received by the portable repeater at the second location.

At step 1006, the portable repeater at the second location boosts and transmits the signal at a second frequency to a mobile radio and Cross Band repeater at a third location. The handie talkie at the first location may be a VHF handie talkie, UHF handie talkie, any other suitable handie talkie, or any combination of the same compatible with the portable repeater. The third location may be in Battalion car 318 outside of building 302 or any other suitable location. The second frequency may be any suitable frequency within the frequency band of the portable repeater that is capable of being received by the mobile radio and Cross Band repeater at the third location.

At step 1008, the Cross Band repeater at the third location regenerates and transmits the signal at a third frequency to a handie talkie at a fourth location. The handie talkie may be a VHF handie talkie, UHF handie talkie, or any other suitable handie talkie. The fourth location may be the lobby 208 of the building 202 or any other suitable location. Path 1000 then ends at step 1010. The third frequency may be any suitable frequency within the frequency band of the Cross Band repeater at the third location that is capable of being received by the handie talkie at the fourth location.

Path 1050 (FIG. 10B) illustrates the return communications path from the fourth location to the first location. Path 1050 begins at step 1052. At step 1054, the handie talkie at the fourth location transmits a signal at the third frequency to the Cross Band repeater and mobile radio at the third location. The Cross Band repeater regenerates and transmits the signal at the second frequency to the mobile radio. At step 1056, the mobile radio transmits the signal at the second frequency to the portable repeater at the second location. At step 1058, the portable repeater regenerates and transmits the signal at the first frequency to the handie talkie at the first location. The portable repeater may be capable of receiving the signal from, and transmitting the signal to, multiple handie talkies at multiple locations. The signals may be transmitted to the handie talkies at one of the earlier transmitted frequencies or at any other suitable frequency capable of being received by the handie talkies. Path 1050 then ends at step 1060.

Figure 11A:
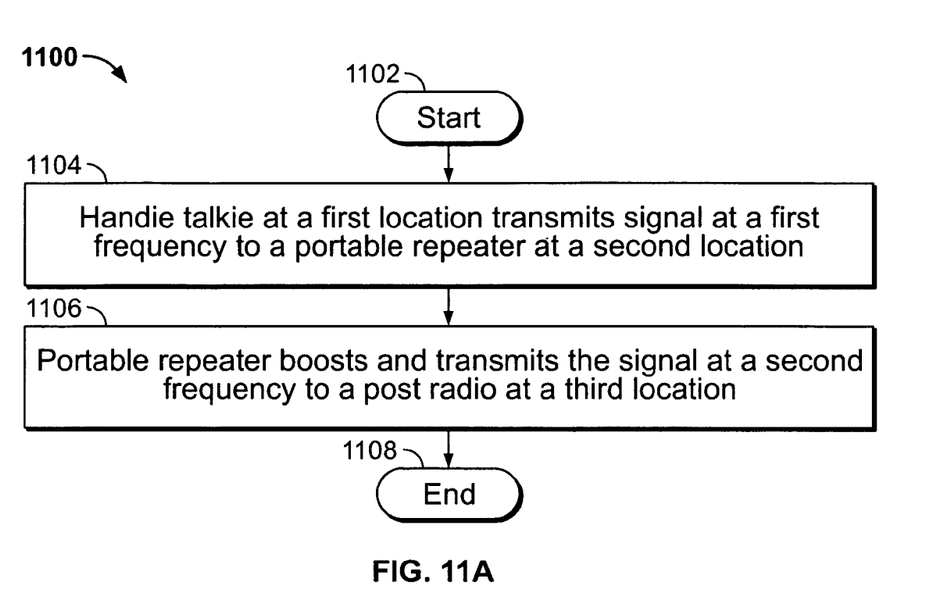
Figure 11B:
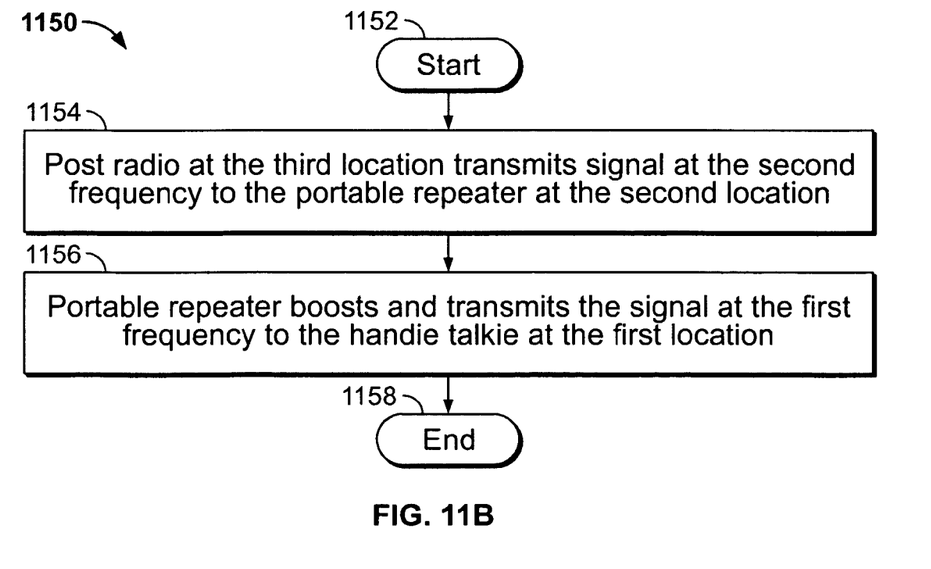

FIGS. 11A-11B are flow diagrams of the communications path between two or more locations using handie talkies by incorporating in the use of a command post radio in accordance with a further embodiment of the invention. Path 1100 begins at step 1102. At step 1104, a handie talkie at a first location transmits a signal at a first frequency to a portable repeater at a second location. The portable repeater may be any suitable repeater including, for example, a Cross Band repeater that has been converted to operate from a direct current (DC) power source (e.g., at 12 volts). The portable repeater may be capable of receiving the signal from, and transmitting the signal to, multiple post radios, handie talkies, or any combination of the same at multiple locations. The first location may be the fire floor 304 of the building or any other suitable location. The second location may be the floor 306 below the fire floor 304 of the building 302 or any other suitable location. The first frequency may be any suitable frequency within the frequency band of the handie talkie that is capable of being received by the portable repeater.

At step 1106, the portable repeater boosts and transmits the signal at a second frequency to a post radio at a third location. The post radio in the third location may be VHF, UHF or any other band compatible with the portable repeater. The post radio may function in any suitable frequency band and may include any suitable features such as, for example, those features illustrated and described in connection with FIGS. 4-7. The post radio may be capable of receiving the signal from, and transmitting the signal to, multiple handie talkies at multiple locations. The third location may be in the lobby 308 of the building 302 or any other suitable location. The second frequency may be any suitable frequency within the frequency band of the portable repeater that is capable of being received by the post radio. Path 1100 then ends at step 1108.

Path 1150 illustrates the return communications path from the third location to the first location. Path 1150 begins at step 1152. At step 1154, the post radio at the third location transmits a signal at the second frequency to the portable repeater at the second location. At step 1156, the portable repeater transmits the signal at the first frequency to the handie talkie at the first location. Path 1150 then ends at step 1158.

Thus it is seen that a command post radio provides for more reliable radio communications between two or more locations using handie talkies by incorporating in the use of a command post radio. One skilled in the art will appreciate that the invention can be practiced by other than the prescribed embodiments, which are presented for purposes of illustration and not of limitation, and the invention is limited only by the claims which follow.

What is claimed is:

1. A method for providing radio communications between two or more locations using handie talkies by incorporating in the use of a command post radio, the method comprising:

transmitting a message over a first frequency from a first handie talkie at a first location to a second handie talkie at a second location;

in response to receiving the message with the second handie talkie, transmitting the message over a second frequency from a post radio at the second location to a mobile radio at a third location;

transmitting the message over the second frequency from the mobile radio to a cross band repeater at the third location; and transmitting the message over a third frequency from the cross band repeater to a third handie talkie at a fourth location.

2. The method of claim 1 further comprising at least one of:
transmitting the message over the second frequency from the first handie talkie to the mobile radio; and
transmitting the message over the second frequency from the second handie talkie to the mobile radio.

3. The method of claim 1 further comprising transmitting the message over a fourth frequency from the post radio to a second post radio at the third location.

4. The method of claim 1 wherein the first handie talkie, the second handie talkie, and the third handie talkie are each one of an ultra high frequency handie talkie and a very high frequency handie talkie.

5. The method of claim 1 wherein:
the first location is on a given floor of a building;
the second location is on a floor below the given floor of the building;
the third location is in an area outside the building; and
the fourth location is in a lobby of the building.

6. The method of claim 1 further comprising:
transmitting a second message over the third frequency from the third handie talkie to the cross band repeater;
transmitting the second message over the second frequency from the cross band repeater to the mobile radio;
transmitting the second message over the second frequency from the mobile radio to the post radio; and
in response to receiving the second message with the post radio, transmitting the second message over the first frequency from the second handie talkie to the first handie talkie.

7. The method of claim 6 further comprising transmitting the second message over the first frequency from the post radio to a plurality of handie talkies at a plurality of locations.

8. A method for providing radio communications between two or more locations using handie talkies by incorporating in the use of a command post radio, the method comprising:
receiving a first message over a first frequency from a handie talkie at a first location with a first post radio at a second location;
transmitting the first message over a second frequency with the first post radio to a second post radio at a third location;
receiving a second message over the second frequency from the second post radio with the first post radio; and
transmitting the second message over the first frequency with the first post radio to the handie talkie.

9. The method of claim 8 further comprising transmitting the message over the second frequency with the first post radio to a plurality of second post radios at a plurality of locations.

10. The method of claim 8 wherein:
the first location and the second location are on a given floor of a building; and
the third location is in a lobby of the building.

11. The method of claim 8 wherein:
the first location is on a given floor of a building;
the second location is on a floor below the given floor of the building; and
the third location is in a lobby of the building.

12. The method of claim 8 further comprising transmitting the second message with the first post radio to a plurality of handie talkies at a plurality of locations.

13. The method of claim 8 further comprising transmitting the message over a third frequency from the handie talkie to a second handie talkie at a fourth location.

14. The method of claim 13 wherein:
the fourth location is on a given floor of a building;
the first location and the second location are on a floor below the given floor of the building; and
the third location is in a lobby of the building.

15. The method of claim 8 further comprising:
transmitting the message over a third frequency with the first post radio to a mobile radio at a fourth location;
transmitting the message over the third frequency from the mobile radio to a cross band repeater at the fourth location; and
transmitting the message over a fourth frequency from the cross band repeater to a second handie talkie at the third location.

16. The method of claim 15 further comprising:
transmitting a second message over the fourth frequency from the second handie talkie to the cross band repeater;
transmitting the second message over the third frequency from the cross band repeater to the mobile radio; and
receiving the second message over the third frequency from the mobile radio with the post radio.

17. The method of claim 16 wherein:
the fourth location is in an area outside the building;
the first location and the second location are on a given floor of the building; and
the third location is in a lobby of the building.

18. The method of claim 8 wherein the first post radio comprises two post radios linked together.

19. The method of claim 8 further comprising transmitting a second message over the first frequency with the second post radio to the handie talkie.

20. A system to provide radio communications between two or more locations, comprising:
a first handie talkie at a first location configured to transmit a message over a first frequency to a second handie talkie at a second location;
a post radio configured to transmit the message over a second frequency to a mobile radio at a third location; and
a cross band repeater at the third location configured to receive the message over the second frequency and transmit the message over a third frequency to a third handie talkie at a fourth location.

21. The system of claim 20 wherein the first handie talkie, the second handie talkie, and the third handie talkie are each one of an ultra high frequency handie talkie and a very high frequency handie talkie.

22. A system to provide radio communications between two or more locations, comprising:
a handie talkie at a first location;
a first post radio at a second location configured to receive a first message over a first frequency from the handie talkie and transmit a second message over the first frequency to the handie talkie; and
a second post radio at a third location configured to receive the first message over a second frequency from the first post radio and transmit the second message over the second frequency to the first post radio.

23. The system of claim 22 wherein the handie talkie is one of an ultra high frequency handie talkie and a very high frequency handie talkie.

* * * * *